United States Patent
Jeong et al.

(10) Patent No.: US 8,000,578 B2
(45) Date of Patent: Aug. 16, 2011

(54) METHOD, SYSTEM, AND MEDIUM FOR PROVIDING BROADCASTING SERVICE USING HOME SERVER AND MOBILE PHONE

(75) Inventors: Jin Guk Jeong, Suwon-si (KR); Sang Kyun Kim, Yongin-si (KR); Yong Ju Jung, Daejeon (KR); Eui Hyeon Hwang, Goyang-si (KR); Doo Sun Hwang, Seoul (KR); Ji Yeun Kim, Seoul (KR); San Ko, Seoul (KR); Cheol Kon Jung, Suwon-si (KR); Yong Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1193 days.

(21) Appl. No.: 11/651,565

(22) Filed: Jan. 10, 2007

(65) Prior Publication Data

US 2007/0196076 A1    Aug. 23, 2007

(30) Foreign Application Priority Data

Feb. 20, 2006   (KR) .................. 10-2006-0016029

(51) Int. Cl.
*H04N 5/91* (2006.01)
(52) U.S. Cl. .... 386/83; 455/566; 455/414.1; 455/414.3; 455/550; 455/412

(58) Field of Classification Search ............... 455/412.1, 455/418, 414–414.3, 566, 557
See application file for complete search history.

(56) References Cited

U.S. PATENT DOCUMENTS

| 7,366,546 | B2 * | 4/2008 | Grossman et al. | 455/566 |
| 7,634,794 | B1 * | 12/2009 | Paik et al. | 725/62 |
| 2003/0104805 | A1 * | 6/2003 | Weksel | 455/414 |
| 2004/0197082 | A1 | 10/2004 | Yim | |

FOREIGN PATENT DOCUMENTS

| KR | 2003-0014639 | 2/2003 |
| KR | 10-2005-0100124 | 10/2005 |

* cited by examiner

*Primary Examiner* — Phuoc Doan
*Assistant Examiner* — Michael T Vu
(74) *Attorney, Agent, or Firm* — Staas & Halsey LLP

(57) ABSTRACT

A method, system, and medium of providing various types of broadcast services such as a record, a summary, a navigation and a real-time event service with respect to a broadcast content, utilizing a home server, according to a user's request. A broadcast service providing method includes: storing broadcast summary data, navigation data and real-time event data which is generated by analyzing received broadcast data according to a broadcast record request from a user's portable device, in a database; and providing the user's portable device with a streaming service with respect to the stored broadcast summary data, the navigation data and the real-time event data, according to a summary selection request from the user's portable device.

11 Claims, 4 Drawing Sheets

METHOD, SYSTEM, AND MEDIUM FOR PROVIDING BROADCASTING SERVICE USING HOME SERVER AND MOBILE PHONE

CROSS-REFERENCE TO RELATED APPLICATIONS

This application claims the benefit of Korean Patent Application No. 10-2006-0016029, filed on Feb. 20, 2006, in the Korean Intellectual Property Office, the disclosure of which is incorporated herein by reference.

BACKGROUND OF THE INVENTION

1. Field of the Invention

The present invention relates to a broadcast service providing method, system, and medium utilizing a home server and a portable device, and more particularly, to a method, system, and medium of providing various types of broadcast services such as a recording, a summary, a navigation, and a real-time event service with respect to a broadcast content, utilizing a home server, according to a user's request.

2. Description of the Related Art

As an example of a conventional broadcast service providing method, Korean Patent Publication No. 2005-0100124 discloses a method which constructs a broadcast portal server utilizing a portable Internet network and maintains user identifiers and each user's list of broadcast contents, which is different from existing Internet broadcasting. However, in the example of the conventional broadcast service providing method, a user can only watch a broadcast program and is charged for each content.

As another example of the conventional broadcast service providing method, US Patent Publication No. 2004/0197082 discloses a method which performs a scheduled recording in a personal information terminal and displays an electronic play guide (EPG) screen in the personal information terminal and also gives a record command in the personal information terminal. In this instance, the scheduled recording is performed in an existing set top box. Also, in the example of the conventional broadcast service providing method, scheduled recording information is transmitted from the personal information terminal to an event timer which is included in a recording device so as to perform the scheduled recording. Also, the event timer includes a non-volatile memory, stores a scheduled recording name in the non-volatile memory and performs the recording at a scheduled time. However, in the example of the conventional broadcast service providing method, the personal information terminal functions as a remote control. Namely, the personal information terminal is utilized to prevent a power consumption by the set top box.

As still another example of the conventional broadcast service providing method, Korean Patent Publication No. 2003-0014639 discloses a method which shares a broadcast that is received from a single broadcast receiving server, in a personal computer (PC) accessing a network. In this instance, the received broadcast is converted into a Moving Picture Experts Group (MPEG) format and streamed to the accessing PC, and the PC receives the broadcast via a web browser. However, in the example of the conventional broadcast service providing method, several persons can only watch a program via a PC utilizing a single broadcast receiver.

As described above, the conventional broadcast service providing method receives a broadcast, records the broadcast and provides a user with the recorded broadcast. Namely, it is limited to a service enabling the user to watch only the recorded broadcast. Accordingly, a user's various desires may not be satisfied.

Accordingly, a method which can record a received broadcast program so that a user can watch, and also can provide the user with various additional services associated with the received broadcast program at the user's desired time or place is required.

SUMMARY OF THE INVENTION

Additional aspects, features, and/or advantages of the invention will be set forth in part in the description which follows and, in part, will be apparent from the description, or may be learned by practice of the invention.

An aspect of the present invention provides a method, system, and medium for providing a broadcast summary service to a portable device so that a user may watch only major scenes of a broadcast program that is recorded in a home server.

An aspect of the present invention also provides a method, system, and medium for providing a broadcast navigation service to a portable device so that a user may watch only the user's desired scenes of a broadcast program that is recorded in a home server.

An aspect of the present invention also provides a method, system, and medium of providing a broadcast real-time event service to a portable device which, when an interesting event previously designated by a user occurs, the occurrence of the event is notified to the user so that the user may watch only the pre-designated interesting event.

According to an aspect of the present invention, there is provided a broadcast service providing method including: storing broadcast summary data, navigation data and real-time event data which is generated by analyzing received broadcast data according to a broadcast record request from a user's portable device, in a database; and providing the user's portable device with a streaming service which streams at one of the stored broadcast summary data, navigation data and real-time event data, according to a selection request from the user's portable device.

According to an aspect of the present invention, there is provided a broadcast service providing method including: storing broadcast summary data which is generated by analyzing received broadcast data according to a broadcast record request from a user's portable device, in a database; and providing the user's portable device with a streaming service, which streams the stored broadcast summary data, according to a summary selection request from the user's portable device.

According to another aspect of the present invention, there is provided a broadcast service providing method including: storing both navigation data, which is generated by analyzing received broadcast data according to a broadcast record request from a user's portable device, and the received broadcast data; and providing the user's portable device with a streaming service, which streams a selected portion of the stored broadcast data, based on the stored navigation data, according to a navigation selection request from the user's portable device.

According to still another aspect of the present invention, there is provided a broadcast service providing method including: detecting a real-time event by analyzing received broadcast data according to a broadcast record request from a user's portable device; transmitting a notification message of a generation of the real-time event to the user's portable device; and providing the portable device with a streaming service which streams a predetermined portion of the received broadcast data around a point in time when the detected real-time event is generated, according to an event check request from the user's portable device.

According to yet another aspect of the present invention, there is provided a broadcast service providing system including: a broadcast receiving unit receiving broadcast data; a summary generation unit generating broadcast summary data by analyzing the received broadcast data according to a broadcast record request; a database storing the generated broadcast summary data and the received broadcast data; and an input/output management unit receiving any one of the broadcast record request and a summary selection request from a user's portable device, selecting the stored broadcast summary data according to the summary selection request, and streaming the selected broadcast summary data to the user's portable device.

According to yet another aspect of the present invention, there is provided at least one medium including computer readable instructions implementing the methods of the present invention.

According to yet another aspect of the present invention, there is provided a broadcast service providing system including a summary generation unit generating broadcast summary data by analyzing received broadcast data according to a broadcast record request; a database storing the generated broadcast summary data and the received broadcast data; and an input/output management unit receiving the broadcast record request and a summary selection request from a user's portable device, selecting the stored broadcast summary data according to the summary selection request, and streaming the selected broadcast summary data to the user's portable device.

According to yet another aspect of the present invention, there is provided a broadcast service providing system including a navigation generation unit generating broadcast navigation data by analyzing received broadcast data according to a broadcast record request; a database storing the generated broadcast navigation data and the received broadcast data; and an input/output management unit receiving any one of the broadcast record request and a navigation selection request from a user's portable device, selecting the stored broadcast navigation data according to the navigation selection request, and streaming the selected broadcast navigation data to the user's portable device.

According to yet another aspect of the present invention, there is provided a broadcast service providing system including a real-time event detection unit detecting a real-time event by analyzing received broadcast data according to a broadcast record request; a database storing the received broadcast data; and an input/output management unit receiving an event check request from a user's portable device, selecting a predetermined portion of the stored broadcast data around a point in time when the real-time event is detected, according to the event check request, and streaming the predetermined portion of the stored broadcast data to the user's portable device.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1:
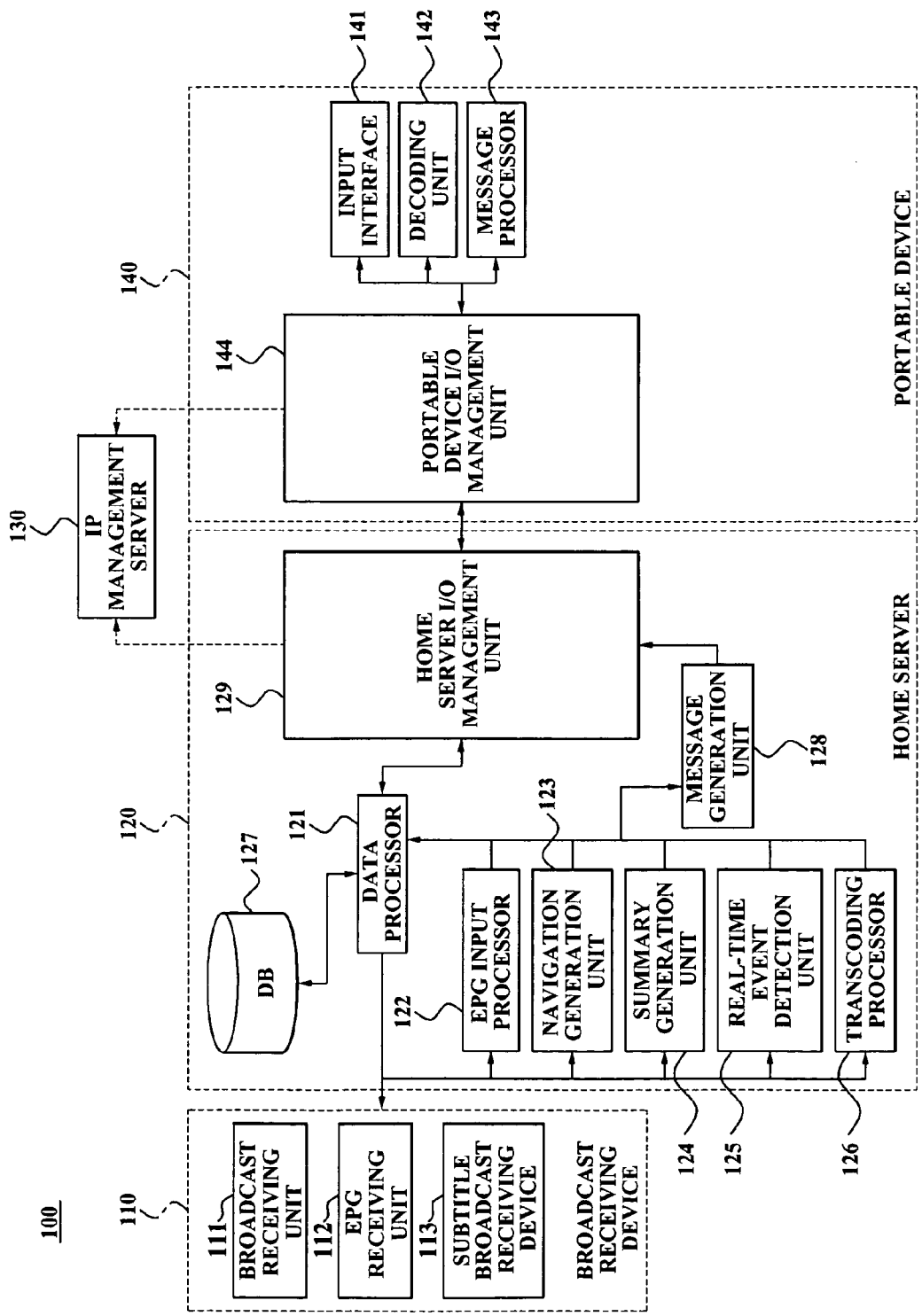
FIG. 1 is a configuration diagram illustrating a broadcast service providing system according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below in order to explain the present invention by referring to the figures.

FIG. 1 is a configuration diagram illustrating a broadcast service providing system 100 according to an exemplary embodiment of the present invention.

Referring to FIG. 1, the broadcast service providing system 100 includes a broadcast receiving device 110, a home server 120, an Internet Protocol (IP) management server 130 and a portable device 140.

The broadcast receiving device 110 includes a broadcast receiving unit 111, an electronic program guide (EPG) receiving unit 112 and a subtitle broadcast receiving unit 113. The broadcast receiving device 110 receives any type of data associated with a broadcast program. The broadcast receiving unit 111 receives various types of broadcast data. The EPG receiving unit 112 receives EPG data. The subtitle broadcast receiving unit 113 receives subtitle broadcast data. In this instance, the broadcast receiving device 110 may be constructed to be independent from the home server 120. Also, the broadcast receiving device 110 may be included in the home server 120.

The home server 120 may be installed in a home. The home server 120 stores and analyzes media The home server 120 transmits data to the portable device 140 and receives data from the portable device 140, which has accessed the home server 120 via a wireless communication method, such as a wireless local area network (WLAN) and a wireless broadband Internet (WiBro).

The home server 120 generates broadcast summary data and navigation data by analyzing broadcast data, which is received from the broadcast receiving device 110. The home server 120 detects a real-time event according to a broadcast record request from the portable device 140.

When recording of the received broadcast data is terminated, the home server 120 generates a record termination message and transmits the generated record termination message to the portable device 140. Also, when the real-time event is detected as a result of analysis of the received broadcast data, the home server 120 generates a notification message of an occurrence of the real-time event and transmits the generated notification message of the occurrence of the real-time event to the portable device 140.

The home server 120 includes a data processor 121, an EPG input processor 122, a navigation generation unit 123, a summary generation unit 124, a real-time event detection unit 125, a transcoding processor 126, a database 127, a message generation unit 128, and a home server input/output management unit 129.

The data processor 121 processes any type of data which is necessary for normal operation of the home server 120. The data processor 121 functions to process data for requesting the EPG receiving unit 112 of the broadcast receiving unit 110 to periodically update EPG data. Namely, the data processor 121 requests the EPG receiving unit 112 of the broadcast receiving device 110 to update EPG data, e.g. every day, every week, or every month. In this instance, the EPG receiving unit 112 transmits the received EPG data to the EPG input processor 122 of the home server 120 according to the EPG updating request.

The EPG input processor 122 converts the EPG data, which is received from the EPG receiving unit 112 of the broadcast receiving device 110, into a format suitable for output on the portable device 140. Also, the EPG input processor 122 transmits the converted EPG data to the data processor 121. Namely, the EPG input processor 122 may parse the received EPG data and convert the parsed EPG data into the format suitable for output on the portable device 140, and request the data processor 121 to store the converted EPG data in the database 127.

In this case, the data processor 121 processes the converted EPG data to be stored in the database 127. Also, as an example, when a request for an initial screen that is received from the portable device 140 via the home server input/output management unit 129 is a request for EPG data, the data processor 121 transmits the EPG data stored in the database 127 to the portable device 140 via the home server input/output management unit 129.

The navigation generation unit 123 analyzes the received broadcast data from the broadcast receiving device 110 and generates navigation data. The navigation data is information which becomes a standard when detecting a broadcast program. Namely, when the received broadcast data is, e.g. a broadcast of a baseball game, the navigation data may be information to detect only the first half of the first inning which is a particular portion of the stored broadcast data that a user desires to watch, and to enable the user to receive a streaming service with respect to the particular portion.

While recording the received broadcast data, the navigation generation unit 123 separates video data by demultiplexing the received broadcast data and genre data, detects a shot conversion, and extracts low level information from the separated video data. In this instance, the low level information includes color information and edge information.

When the received broadcast data is, e.g. a broadcast of a baseball game, after recording of the received broadcast data, the navigation generation unit 123 detects a play section utilizing the detected shot conversion and the extracted low level information, detects/recognizes subtitle data from the video data and divides a current progress state of the baseball game into the first half/second half utilizing the detected play section and the subtitle data. As an example, in the case of the baseball game, the subtitle data includes game progress state information including inning information and a number of outs of a game which is in progress, e.g. in the first half of the first inning or the second half of the first inning.

The navigation generation unit 123 determines whether an inning subtitle is changed from the detected subtitle data. Namely, as an example, when the detected subtitle data changes from the second half of the first inning to the first half of the second inning, the navigation generation unit 123 determines that the inning subtitle is changed. When the detected subtitle data changes from the first half of the first inning to the second half of the first inning, the navigation generation unit 123 determines that the inning subtitle is not changed.

When the inning subtitle is changed, the navigation generation unit 123 determines whether a difference between a starting point in time of a current play and a starting point in time of a previous play is greater than a threshold. Generally, it takes longer to change an offense and a defense when the inning subtitle is changed than a time between plays. Accordingly, when the difference between the starting point in time of the current play and the starting point in time of the previous play is greater than the threshold, the navigation generation unit 123 determines that the second half is changed into the first half of a second inning, and generates navigation data corresponding thereto. Also, when the difference between the starting point in time of the current play and the starting point in time of the previous play is not greater than the threshold, the navigation generation unit 123 moves to the previous point in time utilizing the broadcast data. Moving to the previous point in time is preparation for when the change in the inning subtitle is after a change in an actual inning.

When the inning subtitle is not changed, the navigation generation unit 123 determines whether the difference between the starting point in time of the current play and the starting point in time of the previous play is greater than the threshold. When the difference between the starting point in time of the current play and the starting point in time of the previous play is greater than the threshold, the navigation generation unit 123 determines whether a previous number of outs is greater than a current number of outs. When the previous number of outs is greater than the current number of outs, the navigation generation unit 123 determines that the first inning has changed from the first half into the second half and generates navigation data corresponding thereto. Namely, when the previous number of counts is "2" and the current number of outs is "0" without the change in the inning subtitle, the navigation generation unit 123 determines that the first inning has changed from the first half into the second half and generates navigation data corresponding thereto.

As described above, when the received broadcast data is, e.g. a baseball game, the navigation generation unit 123 may generate the navigation data for dividing a game status of the received broadcast data corresponding to "from the first half of the first inning to the second half of the ninth inning" by determining inning changes, such as a change from the first half to the second half, and a change from the second half to the first half, with respect to the received broadcast data of the baseball game.

The navigation generation unit 123 transmits the generated navigation data to the data processor 121. The data processor 121 stores the transmitted navigation data in the database 127.

The summary generation unit 124 generates broadcast summary data of the received broadcast data. When the received broadcast data is, e.g. a broadcast of a soccer game, the summary generation unit 124 separates audio data, genre data, subtitle data and video data by demultiplexing the received broadcast data, the genre data and the subtitle data while recording the broadcast program. In this instance, the summary generation unit 124 detects a support section utilizing the audio data. Also, the summary generation unit 124 detects a section where a keyword such as a goal, a shot, and a heading exists, as a candidate section, utilizing the subtitle data. The support section may be detected via a support vector machine (VCM) classifier. Also, the summary generation unit 124 detects a shot conversion and extracts a field color utilizing the video data with respect to only the detected candidate section.

When recording of the broadcast program is terminated, the summary generation unit 124 ascertains the detected candidate section, combines moving picture data which is identified as an important event section and thus, generates broadcast summary data. Namely, when a penalty area shot is included in the detected candidate section, and an n number of close ups exists after the penalty area shot or a score is changed, the summary generation unit 124 may determine the detected candidate section as the important event section, combine the determined important event section, and generate the broadcast summary data.

The summary generation unit 124 transmits the generated broadcast summary data to the data processor 121. The data processor 121 stores the transmitted broadcast summary data in the database 127.

The real-time event detection unit 125 detects a real-time event utilizing the received broadcast data, the genre data, and the subtitle data. As an example, in the case of the soccer game, the real-time event may be an event that the user of the portable device 140 desires to review an occurrence of the event in real time, e.g. a scene of scoring a goal.

When a goal keyword is generated or a subtitle score is changed, the real-time event detection unit 125 determines a corresponding section as a candidate section utilizing the received broadcast data, the genre data, and the subtitle data. When a speech volume of an announcer is greater than a threshold, the real-time event detection unit 125 determines that a goal event is detected. Accordingly, the real-time event detection unit 125 detects a previous penalty area and an actual goal event section from the video data.

When the received broadcast data is not in a format suitable for output on the portable device 140, the transcoding processor 126 transcodes the received broadcast data to be suitable for output on the portable device 140. Namely, when the received broadcast data is, e.g. in a format used in a digital broadcast such as MPEG-2, its bandwidth use is high and its screen size is also relatively huge. Accordingly, the transcoding processor 126 may transcode the received broadcast data into a Windows Media Video (WMV) or MPEG-4 format with which a streaming service may be provided in the portable device 140.

The transcoding processor 126 transmits the transcoded broadcast data to the data processor 121. The data processor 121 stores the transcoded broadcast data in the database 127.

The database 127 stores any type of data for providing a broadcast service according to the present invention. Namely, the database 127 may store the EPG data, the navigation data, the broadcast summary data and the transcoded broadcast data, respectively.

When recording of the received broadcast data is terminated according to the broadcast record request, the message generation unit 128 generates a record termination notification message for notifying that the recording of the received broadcast data is terminated, and transmits the generated record termination notification message to the portable device 140 via the home server input/output management unit 129. Also, when the real-time event is detected while recording the received broadcast data according to the broadcast record request, the message generation unit 128 generates a notification message of an occurrence of the real-time event for notifying the occurrence of the real-time event, and transmits the generated notification message of the occurrence of the real-time event to the portable device 140 via the home server input/output management unit 129.

When the home server 120 is not a fixed Internet Protocol number (IP), the data processor 121 requests the home server input/output management unit 129 to transmit its IP and device serial number to the IP management server 130 when the home server 120 accesses a network. The device serial number may be replaced with an identification number (ID)/password. The ID/password may be stored as a cookie. The home server input/output management unit 129 transmits its IP and device serial number to the IP management server 130.

When the home server 120 is not a fixed IP, the IP management server 130 stores a home server IP which is transmitted from the home server input/output management unit 129 when the home server 120 accesses a network. Also, when a request for access to the home server 120 is received from the portable device 140, the IP management server 130 establishes a session connection between the home server 120 and the portable device 140 utilizing the stored home server IP.

The home server input/output management unit 129 manages an input on a broadcast record request, a summary selection request, a navigation selection request or an event check request, from the portable device 140 of the user who has accessed via a wireless network.

The home server input/output management unit 129 manages an output of streaming data with respect to selected broadcast summary data, so that a streaming service with respect to the selected broadcast summary data according to the summary selection request may be provided for the portable device 140 of the user who has accessed via the wireless network.

The home server input/output management unit 129 manages an output of streaming data with respect to a predetermined portion of the stored broadcast data which is selected by navigation data according to the navigation selection request, so that a streaming service with respect to the selected portion may be provided to the user's portable device 140.

The home server input/output management unit 129 selects a predetermined portion of the stored broadcast data around a point in time when the real-time event is detected according to the event check request, and manages an output of streaming data with respect to the selected portion, so that a streaming service with respect to the selected portion may be provided to the user's portable device 140.

When the home server 120 is a fixed IP, the portable device 140 may directly access the home server 120 via the fixed IP. However, when the home server 120 is not a fixed IP, a session connection between the home server 120 and the portable device 140 may be established via the IP management server 130. Namely, the portable device 140 parses the IP of the home server 120 via the IP management server 130, e.g. "http://www.anycalland.com/connect.php? Id=Jinguk".

When the session connection between the home server 120 and the portable device 140 is established, the portable device 140 communicates data with the home server 120 according to various types of wireless communication methods, such as a WLAN and a WiBro method.

The portable device 140 includes an input interface 141, a decoding unit 142, a message processor 143, and a portable device input/output management unit 144.

The input interface 141 receives a request for an initial screen from a user. The request for the initial screen is to request the home server 120, accessed by the portable device 140, to provide the EPG data on the initial screen of the portable device 140, so as to provide a broadcast service.

Also, the input interface 141 receives a broadcast record request with respect to a predetermined broadcast program from the user who has reviewed the EPG data on the initial screen, according to the EPG data. The user may select a broadcast program that the user desires to record via the input interface 141 according to the EPG data and input the broadcast record request, so that the selected broadcast program may be recorded.

Also, the input interface 141 receives a summary selection request, a navigation selection request or an event check request with respect to the recorded broadcast program, according the broadcast record request. In this instance, the summary selection request includes information for selecting the broadcast summary data which is generated by the recorded broadcast program. The navigation selection request includes information for navigating a particular portion of the recorded broadcast program. The event check request includes information for detecting a real-time event of the recorded broadcast program.

The decoding unit 142 decodes streaming data which is inputted via the portable device input/output management unit 144 and outputs the decoded streaming data via a display unit.

The message processor 143 processes any type of message which is transmitted from the home server 120 via the portable device input/output management unit 144 and displays the result of the process on the display unit. In this instance, the message may be a record termination message notifying that recording of the broadcast program is terminated or a notification message of an occurrence of a real-time event notifying that the real-time event has occurred while the broadcast program is recording.

The portable device input/output management unit 144 manages an input/output between the home server 120 and the portable device 140 which are connected to each other via the wireless network. Namely, the portable device input/output management unit 144 outputs the request for the initial screen, the broadcast record request, the summary selection request, the navigation selection request, or the event check request and transmits the outputted request to its connected home server 120 via the wireless network.

The portable device input/output management unit 144 receives EPG data which is transmitted from the home server 120, which is connected via the wireless network, according to the request for the initial screen. Also, the portable device input/output management unit 144 receives streaming data which is transmitted from the connected home server 120 via the wireless network according to the summary selection request, the navigation selection request, or the event check request. Also, the portable device input/output management unit 144 receives the record termination message or the notification message of the occurrence of the real-time event which is transmitted from the connected home server 120 via the wireless network.

As described above, in a broadcast service providing system according to the present invention, when a portable device that is not embedded with a broadcast receiver requests a home server to record a user's desired broadcast program, the home server may generate broadcast summary data according to the recording of the broadcast program and provide the portable device with a streaming service with respect to the generated broadcast summary data according to a summary selection request of the portable device.

Also, in a broadcast service providing system according to the present invention, when a portable device that is not embedded with a broadcast receiver requests a home server to record a desired broadcast program, the home server may generate navigation data according to the recording of the broadcast program and provide the portable device with a streaming service with respect to a predetermined portion that is selected by navigating the recorded broadcast program with the generated navigation data, according to a navigation selection request of the portable device.

Also, in a broadcast service providing system according to the present invention, when a portable device that is not embedded with a broadcast receiver requests a home server to record a user's desired broadcast program, the home server may provide the portable device with a streaming service with a predetermined portion of the received broadcast data around a point in time when a real time event is detected while the broadcast program is recorded.

Also, a broadcast service providing system may provide a portable device with a streaming service with respect to broadcast summary data or a predetermined selected portion, and may also provide the portable device with the streaming service with respect to the entire broadcast data of a recorded broadcast program according to a request for the entire broadcast data of the recorded broadcast program from a user of the portable device.

Figure 2:
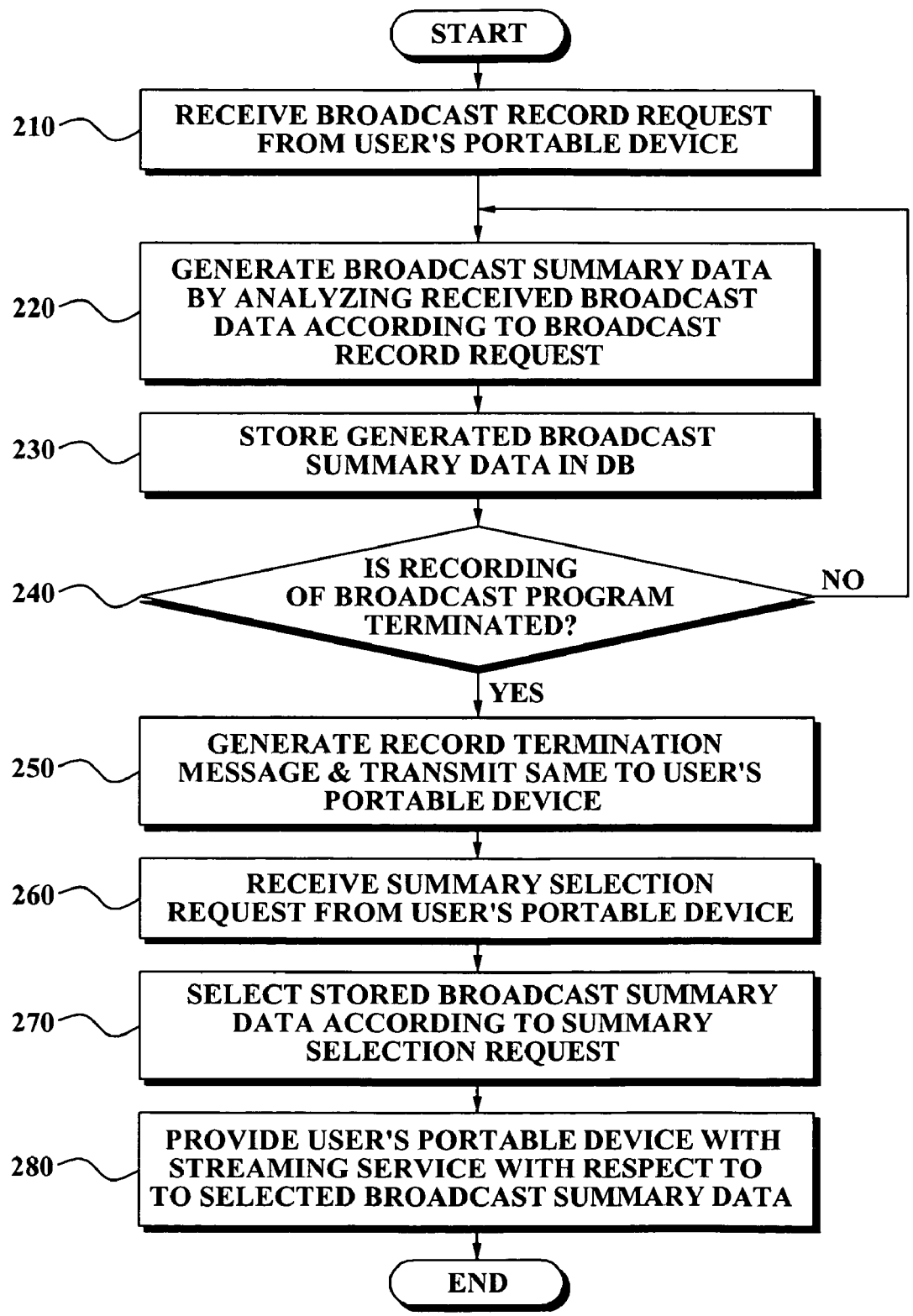
FIG. 2 is a flowchart illustrating a broadcast service providing method according to an exemplary embodiment of the present invention.

FIG. 2 is a flowchart illustrating a broadcast service providing method according to an exemplary embodiment of the present invention.

Referring to FIG. 2, in operation 210, a home server receives a broadcast record request from a user's portable device. The broadcast record request is for when the user who has reviewed EPG information selects a desired broadcast program and requests the home server to record the selected broadcast program. Namely, in operation 210, the home server receives the broadcast record request in a state where the home server is connected to the portable device via a wireless network.

As an example, when the user desires to watch an A match game against a Brazilian team to be broadcasted at 2 p.m. but since the user is at work, the user may not be able to watch the soccer game. In this case, the user accesses the home server via the portable device. In this instance, when an IP of the home server is a fixed IP, the portable device may directly access the home server via a wireless network. Also, when the IP of the home server is not a fixed IP, the portable device may access the home server via an IP management server. When the portable device accesses the home server, the portable device transmits a request for transmitting EPG information to its accessed home server according to a request for an initial screen.

When the EPG information transmission request is received from the portable device, the home server transmits the EPG information to the portable device according to the EPG information transmission request. The home server may request an EPG receiving unit to periodically update EPG data. Also, the home server may convert the received EPG data into a format suitable for output on a display unit of the portable device and store the EPG information in a database. When the portable device accesses the home server, the home server may transmit the EPG information to the portable device to be outputted on the initial screen of the display unit.

The portable device receives a broadcast record request with respect to the user's desired broadcast program via an input interface from the user who has checked the received EPG information. The portable device transmits the broadcast record request to the home server via a portable device input/output management unit.

In operation 220, the home server receives broadcast data with respect to the user's desired broadcast program at a set time according to the broadcast record request, analyzes the received broadcast data and generates broadcast summary data. Namely, at 2 p.m., a starting time of the broadcast program, the home server may receive broadcast data of the soccer game, record the broadcast data and generate broadcast summary data by analyzing the broadcast data which is being recorded. When the broadcast program is, e.g. a soccer game, the broadcast summary data may include major game scenes, such as a shot and a goal.

In operation 230, the home server stores the broadcast summary data in the database. The broadcast summary data is generated by analyzing the broadcast program being recorded. Also, in operation 230, the home server may transcode the received broadcast data to convert the received broadcast data into a suitable format for output on a display unit of the portable device, and store the transcoded broadcast data in the database, according to the broadcast record request.

In operation 240, the home server determines whether recording of the broadcast program is terminated.

In operation 250, when the recording of the broadcast program is terminated, the home server generates a record termination message with respect to the broadcast program and transmits the generated record termination message to the user's portable device. In this case, the portable device receives the record termination message which is transmitted from the home server. In this instance, when the user desires to initially review the received record termination message and receive a summary service with respect to the recorded broadcast program, the user accesses the home server via the portable device. The portable device receives a summary selection request from the user and transmits the received summary section request to the accessed home server. When there is a plurality of stored broadcast summary data, the summary selection request includes information for selecting broadcast summary data desired by the user.

In operation 260, the home server receives the summary selection request which is transmitted from the user's portable device.

In operation 270, the home server selects one stored broadcast summary data from the plurality of stored broadcast summary data, which are stored in the database, according to the summary selection request.

In operation 280, the home server provides the portable device with a streaming service with respect to the selected broadcast summary data. Namely, in operation 280, the home server transmits streaming data with respect to the selected broadcast summary data, to the portable device. In this instance, the portable device receives the streaming data with respect to the broadcast summary data transmitted from the home server, and decodes and outputs the streaming data.

As described above, in a broadcast summary service providing method according to the present exemplary embodiment, when a user of a portable device that is not embedded with a broadcast receiver requests a home server to record the user's desired broadcast program, the home server may analyze the broadcast program and generate broadcast summary data while recording the broadcast program, and after the recording of the broadcast summary data is terminated, provide the portable device with a streaming service with respect to the generated broadcast summary data according to the user's request.

Figure 3:
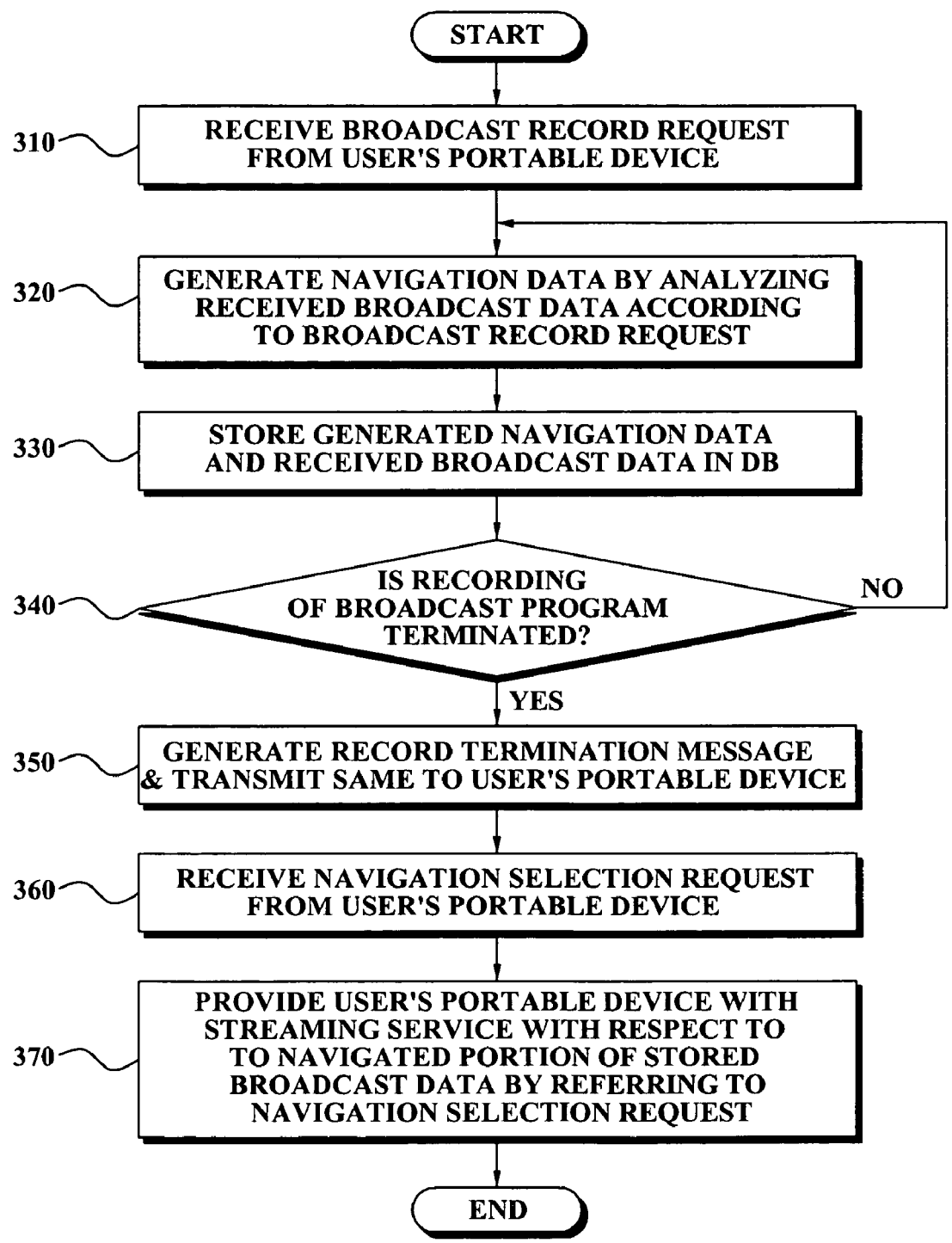
FIG. 3 is a flowchart illustrating a broadcast service providing method according to another exemplary embodiment of the present invention.

FIG. 3 is a flowchart illustrating a broadcast service providing method according to another exemplary embodiment of the present invention.

Referring to FIG. 3, in operation 310, a home server receives a broadcast record request from a user's portable device. The broadcast record request is for when the user who has checked EPG information selects a desired broadcast program and requests the home server to record the selected broadcast program.

In operation 320, the home server receives broadcast data with respect to the user's desired broadcast program at a set time according to the broadcast record request, analyzes the received broadcast data and generates navigation data. Namely, when the broadcast program is, e.g. a baseball game, the navigation data is utilized for navigating the recorded broadcast program so as to locate a particular portion of the broadcast program, e.g. a first half of a fifth inning and a second half of a ninth inning.

In operation 330, the home server stores the generated navigation data and the received broadcast data in the database. Namely, in operation 330, the home server may transcode the received broadcast data to convert the received broadcast data into a suitable format for output on a display unit of the portable device, and store the transcoded broadcast data and the generated navigation data in the database, according to the broadcast record request.

In operation 340, the home server determines whether recording of the broadcast program is terminated.

In operation 350, when the recording of the broadcast program is terminated, the home server generates a record termination message with respect to the broadcast program and transmits the generated record termination message to the user's portable device. In this case, the portable device receives the record termination message which is transmitted from the home server. In this instance, when the user desires to initially review the received record termination message and receive a navigation service with respect to the recorded broadcast program, the user accesses the home server via the portable device and, when the broadcast program is, e.g. a baseball game, reviews a result of the baseball game. When many runs are gained in the first half of the fifth inning as the result of the baseball game, the user may input a navigation selection request for selecting only broadcast data with respect to the first half of the fifth inning from the recorded broadcast game. In this case, the portable device receives the navigation selection request from the user and transmits the received navigation selection request to the accessed home server.

In operation 360, the home server receives the navigation selection request which is transmitted from the user's portable device.

In operation 370, the home server provides the user's portable device with a streaming service with respect to a navigated portion of the stored broadcast data by referring to the stored navigation data according to the navigation selection request. Namely, in operation 370, the home server transmits streaming data with respect to a game corresponding to the first half of the fifth inning which is navigated from the stored baseball game broadcast data, to the portable device according to the navigation selection request. In this instance, the portable device may receive the streaming data with respect to the first half game of the fifth inning of the baseball game broadcast data, and decode and display the received streaming data according to the navigation selection request.

As described above, in a broadcast navigation service providing method according to the present exemplary embodiment, when a user of a portable device not embedded with a broadcast receiver requests a home server to record the user's desired broadcast program, the home server may analyze the broadcast program and generate navigation data while recording the broadcast program, and after the recording of the navigation data is terminated, provide the portable device with a streaming service with respect to moving picture data of a necessary portion of the recorded broadcast program utilizing the generated navigation data according to the user's request.

Figure 4:
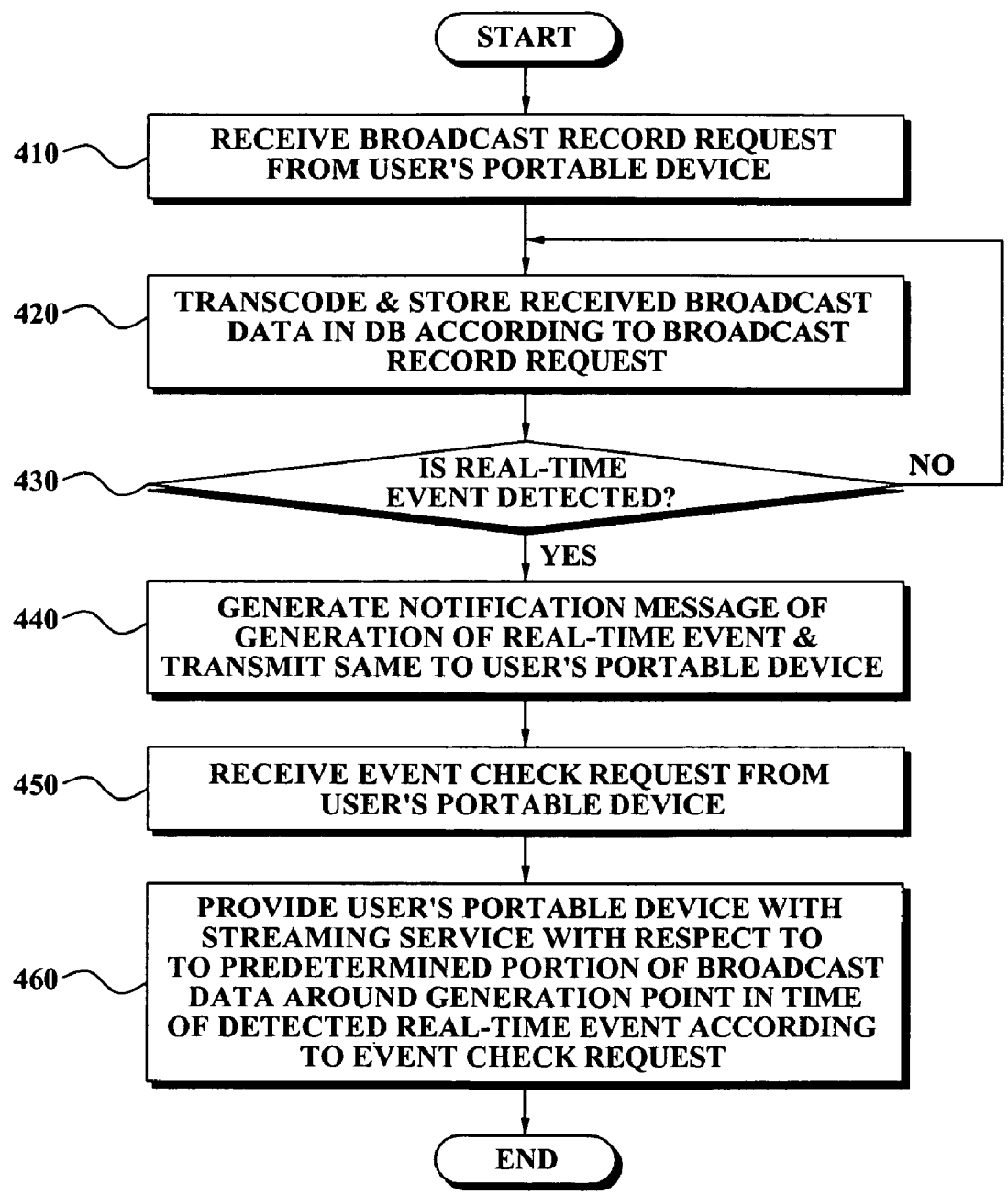
FIG. 4 is a flowchart illustrating a broadcast service providing method according to still another exemplary embodiment of the present invention.

FIG. 4 is a flowchart illustrating a broadcast service providing method according to still another exemplary embodiment of the present invention.

Referring to FIG. 4, in operation 410, a home server receives a broadcast record request from a user's portable device. The broadcast record request is for when the user who has reviewed EPG information selects a desired broadcast program and requests the home server to record the selected broadcast program.

In operation 420, the home server may transcode the received broadcast data to convert the received broadcast data into a suitable format for output on a display unit of the portable device, and store the transcoded broadcast data and the generated navigation data in the database, according to the broadcast record request.

In operation 430, the home server analyzes the received broadcast data and determines whether a real-time event has occurred according to the broadcast record request. In this instance, the real-time event is a most important event in the broadcast program which is being recorded, and is detected in real time. When the broadcast program is, e.g. a soccer game, the real-time event may include an event such as a shot and a goal. Also, when the broadcast program is, e.g. a baseball game, the real-time event may include an event, such as a homerun and scoring a run. Also, when the broadcast program is, e.g. a music show program, the real-time event may include an event that the user's favorite singer sings a song.

In operation 440, when the real-time event described above is detected, the home server generates a notification message of the occurrence of the real-time event and transmits the generated notification message of the occurrence of the real-time event to the user's portable device. In this case, the portable device receives the notification message of the occurrence of the real-time event which is transmitted from the home server. In this instance, when the user desires to initially review the received notification message of the occurrence of the real-time event and receive a service with respect to the real-time event occurring in the recorded broadcast program, the user accesses the home server via the portable device. Also, when the portable device accesses the home server, the portable device receives an event check request with respect to the occurring real-time event from the user and transmits the received event check request to the home server.

In operation 450, the home server receives the event check request which is transmitted from the user's portable device.

In operation 460, the home server provides the user's portable device with a streaming service with respect to a predetermined portion of the received broadcast data around a point in time when the detected real-time event is generated, according to the event check request. Namely, the home server transmits the streaming data with respect to the predetermined portion of the broadcast data stored in the database, around the occurring point in time of the detected real-time event according to the event check request. The portable device decodes and outputs the streaming data with respect to the predetermined portion around the occurring point in time of the real-time event which is transmitted from the home server. Namely, when the real-time event is, e.g. a score gained by a penalty kick in a soccer game, the portable device decodes and outputs streaming data with respect to a penalty kick scene before a point in time when the score is gained and a scene, such as a goal celebration, after the point in time when the score is gained.

As described above, in a real-time event service providing method according to the present exemplary embodiment, when a user of a portable device that is not embedded with a broadcast receiver requests a home server to record the user's desired broadcast program, the home server may analyze the broadcast program while recording the broadcast program, and when a real-time event is detected, provide the portable device with a streaming service with respect to moving picture data around the occurring point in time of the detected real-time event according to the user's request.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, or DVDs), magneto-optical media (e.g., floptical disks), and hardware storage devices (e.g., read only memory media, random access memory media, flash memories, etc.), which may include computer readable code/instructions, data files, data structures, etc. The medium/media may also be a distributed wireless network, so that the computer readable code/instructions is/are stored and executed in a distributed fashion. The computer readable code/instructions may be executed by one or more processors. In addition, the above hardware devices may be configured to act as one or more software modules in order to perform the operations of the above-described exemplary embodiments. Further, one or more application specific integrated circuits (ASIC) may be configured to act as one or more software modules in order to perform the operations of the above-described exemplary embodiments.

According to the above-described exemplary embodiments of the present invention, there may be provided a method, system, and medium for providing a broadcast summary service to a portable device so that a user may watch only major scenes of a broadcast program that is recorded in a home server.

According to the above-described exemplary embodiments of the present invention, there may be provided a method, system, and medium for providing a broadcast navigation service to a portable device so that a user may watch only the user's desired scenes of a broadcast program that is recorded in a home server.

According to the above-described exemplary embodiments of the present invention, there may be provided a method, system, and medium of providing a broadcast real-time event service to a portable service which, when an interesting event previously designated by a user occurs, the occurrence of the event is notified to the user so that the user may watch only the previously designated interesting event.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A broadcast service providing method comprising:

storing broadcast summary data which is generated by analyzing received broadcast data according to a broadcast record request from a user's portable device, in a database;

providing the user's portable device with a streaming service, which streams the stored broadcast summary data, according to a summary selection request from the user's portable device;

generating navigation data by analyzing the received broadcast data according to the broadcast record request, wherein the database stores the generated navigation data; and receiving a navigation selection request from the user's portable device, selecting a predetermined portion of the stored broadcast data by referring to the navigation data according to the navigation selection request and outputting streaming portion of the stored broadcast data to the user's portable device.

2. The method of claim 1, wherein the storing of the broadcast summary data comprises:

receiving the broadcast record request from the user's portable device;

generating the broadcast summary data by analyzing the received broadcast data according to the broadcast record request; and storing the generated broadcast summary data in the database.

3. The method of claim 1, wherein the providing of the streaming service comprises:

receiving the summary selection request from the user's portable device;

selecting the stored broadcast summary data according to the summary selection request; and providing the user's portable device with the streaming service, which streams the selected broadcast summary data.

4. The method of claim 1, further comprising:

transmitting a record termination message to the user's portable device when recording of the received broadcast data is terminated.

5. At least one non-transitory medium comprising computer readable instructions implementing the method of claim 1.

6. A broadcast service providing system comprising:

a summary generation unit to generate broadcast summary data by analyzing received broadcast data according to a broadcast record request;

a database to store the generated broadcast summary data and the received broadcast data;

an input/output management unit to receive the broadcast record request and a summary selection request from a user's portable device, to select the stored broadcast summary data according to the summary selection request, and to stream the selected broadcast summary data to the user's portable device; and a navigation generation unit to generate navigation data by analyzing the received broadcast data according to the broadcast record request, wherein the database stores the generated navigation data, and the input/output management unit receives a navigation selection request from the user's portable device, selects a predetermined portion of the stored broadcast data by referring to the navigation data according to the navigation selection request and outputs streaming portion of the stored broadcast data to the user's portable device.

7. The system of claim 6, further comprising:

a transcoding processor to transcode the received broadcast data into a format suitable for the user's portable device, wherein the database stores the transcoded broadcast data.

8. A broadcast service providing system comprising:

a summary generation unit to generate broadcast summary data by analyzing received broadcast data according to a broadcast record request;

a database to store the generated broadcast summary data and the received broadcast data;

an input/output management unit to receive the broadcast record request and a summary selection request from a user's portable device, to select the stored broadcast summary data according to the summary selection request, and to stream the selected broadcast summary data to the user's portable device; and a real-time event detection unit to detect a real-time event by analyzing the received broadcast data according to the broadcast record request, wherein the input/output management unit receives an event check request from the user's portable device, selects a predetermined portion of the stored broadcast data around a point in time when the real-time event is detected, according to the event check request, and outputs streaming portion of the stored broadcast data to the user's portable device.

9. The system of claim 8, further comprising:

a transcoding processor to transcode the received broadcast data into a format suitable for the user's portable device, wherein the database stores the transcoded broadcast data.

10. A broadcast providing system comprising:

a summary generation unit to generate broadcast summary data by analyzing received broadcast data according to a broadcast record request;

a database to store the generated broadcast summary data and the received broadcast data;

an input/output management unit to receive the broadcast record request and a summary selection request from a user's portable device, to select the stored broadcast summary data according to the summary selection request, and to stream the selected broadcast summary data to the user's portable device; and a message generation unit to generate a record termination message with respect to the broadcast data when recording of the received broadcast data is terminated and to generate a notification message of generation of a real-time event when the real-time event is detected, wherein the input/output management unit outputs any one of the record termination message and the notification message of generation of the real-time event to the user's portable device.

11. The system of claim 10, further comprising:

a transcoding processor to transcode the received broadcast data into a format suitable for the user's portable device, wherein the database stores the transcoded broadcast data.

* * * * *